(12) United States Patent
Maar et al.

(10) Patent No.: US 10,119,818 B2
(45) Date of Patent: Nov. 6, 2018

(54) SURVEYING POLE

(71) Applicant: LEICA GEOSYSTEMS AG, Heerbrugg (CH)

(72) Inventors: Hannes Maar, Dornbirn (AT); Heinz Bernhard, Berneck (CH); Josef Lais, Marbach (CH); Paul Benz, Diepoldsau (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 192 days.

(21) Appl. No.: 15/382,645

(22) Filed: Dec. 17, 2016

(65) Prior Publication Data
US 2017/0176185 A1    Jun. 22, 2017

(30) Foreign Application Priority Data

Dec. 17, 2015 (EP) .................................... 15200855

(51) Int. Cl.
*G01C 15/06* (2006.01)
*G01B 11/06* (2006.01)
*G01C 15/00* (2006.01)

(52) U.S. Cl.
CPC .......... *G01C 15/06* (2013.01); *G01B 11/0608* (2013.01); *G01C 15/002* (2013.01)

(58) Field of Classification Search
CPC .................................................... G01C 15/06
USPC .................................................. 33/296, 294
See application file for complete search history.

(56) References Cited

U.S. PATENT DOCUMENTS

| 4,029,415 A * | 6/1977 | Johnson | G01C 15/004 33/294 |
| 5,457,890 A * | 10/1995 | Mooty | G01C 15/002 33/293 |
| 5,566,460 A * | 10/1996 | Bates | G01C 15/06 33/293 |
| 5,769,370 A * | 6/1998 | Ashjaee | F16M 11/14 248/168 |
| 6,076,267 A * | 6/2000 | Gotoh | G01C 15/06 33/293 |
| 7,251,899 B2 | 8/2007 | Yandrick et al. | |
| 7,373,725 B1 | 5/2008 | Vanneman et al. | |
| 7,788,815 B2 | 9/2010 | Yandrick et al. | |
| 2001/0019101 A1 | 9/2001 | Ohtomo et al. | |
| 2002/0138994 A1* | 10/2002 | Johnson | G01C 15/02 33/285 |
| 2007/0139262 A1 | 7/2007 | Scherzinger | |

(Continued)

FOREIGN PATENT DOCUMENTS

| EP | 1 130 355 A2 | 9/2001 |
| JP | 2000-234933 A | 8/2000 |

OTHER PUBLICATIONS

European Search Report dated Jun. 27, 2016 in application No. 15200855.3.

*Primary Examiner* — Christopher W Fulton
(74) *Attorney, Agent, or Firm* — Maschoff Brennan

(57) ABSTRACT

Some embodiments of the invention relate to a surveying pole comprising at least two pole sections being telescopically insertable into each other so that a height adjustment of the pole is provided, a pointing tip at the lower end of the pole for setting the pole on a terrain point, a receptacle at an upper end of the pole for mounting a position giving means, a height measuring system for indicating the distance of the position giving means relative to the terrain point.

19 Claims, 4 Drawing Sheets

(56) References Cited

U.S. PATENT DOCUMENTS

| | | | | |
|---|---|---|---|---|
| 2008/0036646 A1* | 2/2008 | Green | G01C 15/00 | 342/118 |
| 2009/0024325 A1* | 1/2009 | Scherzinger | G01C 15/06 | 702/5 |
| 2011/0289788 A1* | 12/2011 | Steffensen | G01C 15/06 | 33/296 |
| 2013/0133214 A1* | 5/2013 | Steffensen | G01C 9/02 | 33/296 |
| 2014/0247439 A1* | 9/2014 | Neier | G01C 15/002 | 356/4.01 |
| 2017/0067740 A1* | 3/2017 | Ang | G01C 15/06 | |
| 2018/0180416 A1* | 6/2018 | Edelman | G01C 15/002 | |

* cited by examiner

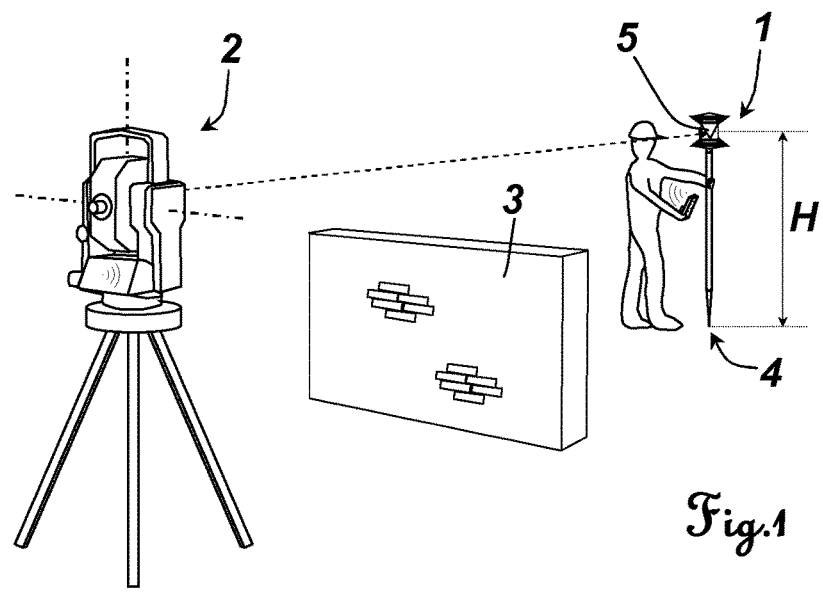
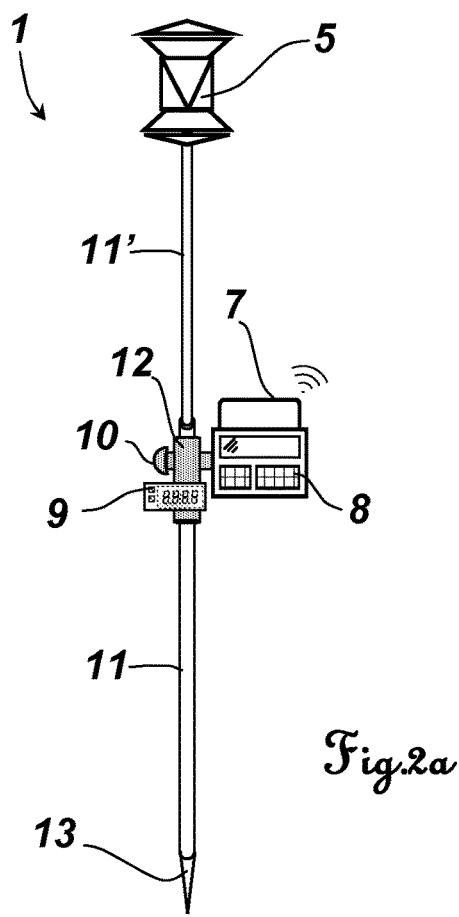
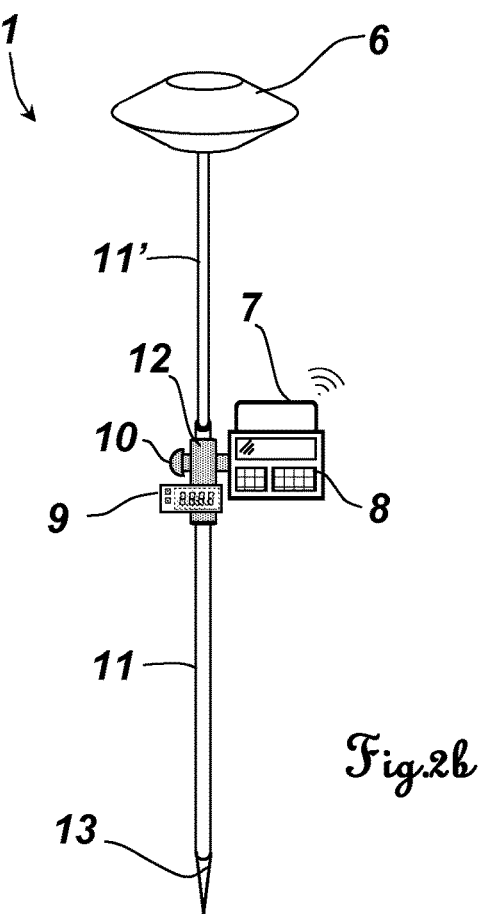
Fig.1
Fig.2a
Fig.2b

SURVEYING POLE

FIELD

The invention relates to a surveying pole for measuring the position of a point on the ground with the help of a geodetic instrument.

BACKGROUND

The use of congeneric surveying poles for staking out and measuring terrain points are known from prior art, for example from U.S. Pat. No. 7,788,815 B2, EP 1 130 355 A2 or JP 2000 234933. In survey applications using geodetic devices such as TPS equipment, a position measurement is not taken of the target point directly, but rather of the receiver or the antenna on the surveying pole. A conclusion to the position of the target point is possible due to the known spatial relationship between the receiver or antenna, and the tip of the pole. With this method it is possible to circumvent obstacles which stand in the direct way between the measuring instrument and the target point.

To provide further flexibility for such obstacles avoidance, usual practice is the realization of a pole adjustable in its height. As the geodetic instrument and the surveying pole are connected with each other in order to communicate, the pole can be given an indication by the geodetic instrument, when visual contact has been obtained. From that, the pole can give notice to its user by an audible, vibratory and/or visual signal.

Survey pole solutions comprising a GNSS antenna are not reliant on a geodetic instrument as they obtain their positional data via a satellite positioning system. However, to increase measurement accuracy, a GNSS reference station might be provided at the scene. In traditional surveying with a GNSS-pole the surveyor places the pole tip onto the measuring point, levels the pole and triggers the GNSS measurement, the results of which include also height information.

As for the height measurement of the pole adjusted in the described way, current solutions are either manual reading from a tape measure or automatic measurements with a measurement system based on the surveying pole. Conventional, i.e. analogue, surveying poles typically have visual measurement markers (such as a scale and numbers) printed on the pole or on a tape attached to the pole, which makes them operate like an ordinary measuring tape. For this purpose, the poles have a telescopic structure which provides the height adjustability and the measurability by shifting the scale according to the height adjustment.

Other solutions, such as offered in U.S. Pat. No. 7,373,725, provide automatic height measurement using electronic appliances, wherein a reference indicator and a grade-rod reference surface indicating absolute height marks are used for the height detection. Differences in electromagnetic coupling are detected with help of the incremental inductive path detection. Derived from this are a relative movement and a height measurement resorting to this relative distance traveled.

Documents U.S. Pat. No. 7,251,899 B2 and U.S. Pat. No. 7,788,815 B2 further provide a solution for an automatic height measurement for a height-adjustable pole, using a laser distance measurement between a laser sensor mounted at a lower section of the pole, and a lip placed at the top of the pole, the laser sensor and the lip being mounted in a way providing a correlation between the height adjustment of the pole and the separation of the laser sensor and the lip.

However, the solution disclosed in these documents leads to a light path being outside of the pole, which for example has the disadvantage of being prone to external disturbances, and thus requiring an enhanced calibration overlay.

Height measuring solutions for surveying poles known from prior art have several common disadvantages. As surveying jobs are subject to a high expenditure of time, known surveying poles do not meet the needed time efficiency requirements, as a high share of manual steps is necessary. Furthermore, even fully or partly automated solutions are often prone to errors caused by outer disturbances and still require a fair amount of expert knowledge. Therefore, due to manual steps and required expert knowledge, common surveying poles allow for too many sources of error caused by the user.

SUMMARY

Some embodiments of the present invention provide an improved surveying pole for measuring the position of a measuring point on the ground, wherein the pole is particularly improved in accuracy, reliability and usability.

According to some embodiments of the invention a surveying pole comprises of at least two pole sections being telescopically insertable into each other so that a height adjustment of the pole is provided, a pointing tip at the lower end of the pole for setting the pole on a terrain point, a receptacle at an upper end of the pole for mounting a position giving means, a height measuring system for indicating the distance of the position giving means relative to the terrain point, wherein the height measuring system comprises an electronic distance measuring unit, in the following called EDM unit, and a target, the EDM unit and the target being placed inside of the pole in such a way that the EDM unit being adapted to emit a light beam towards the target and to detect the light backscattered by the target, the light beam following a path inside of the pole, the EDM unit and the target further being mounted to the at least two pole sections so that a correlation between the height adjustment of the pole and the separation of the EDM unit and the target is provided, and an evaluation unit for deriving the height of the position giving means based on the detected light of the EDM unit.

In particular, the enclosure of the light path to the inside of the pole has the advantage of producing a stable and controlled measurement environment, which is optimized for the EDM unit. Therefore, a versatile range of different embodiments are provided, without virtually increasing the technological outlay of the pole.

On the one hand, the EDM unit can be placed in an upper pole section, in particular at an upper or lower end of the upper pole section, emitting the light downwards, wherein the target is placed in a lower pole section, in particular at a lower or upper end of the lower pole section or inside the pointing tip. Placing the EDM unit in an upper pole section can for example be advantageous for facilitated extension of the surveying pole or for sharing a power supply with other devices attached to the receptacle of the pole.

On the other hand, instead of emitting the light downwards, the above embodiment can also be reversed, by placing the EDM unit in a lower pole section, in particular at a lower or upper end of the lower pole section or inside the tip, emitting the light upwards, wherein the target is placed in an upper pole section, in particular at the upper or lower end of the upper pole section. One advantage of placing the EDM unit in a lower pole section can be a more favorable weight distribution to the lower end of the pole.

In a further embodiment, the EDM unit is placed in an upper pole section, emitting light downwards, the light being in the visible range, wherein the target is placed inside the pointing tip, which is now detachable, together with the target mounted therein, and the height of the position giving means can be derived by measuring the distance between the EDM unit and the ground. One advantage of this embodiment is a facilitated way for freely extending the measurable height range of the surveying pole (e.g. no extension of electric connections is required) to overcome a high obstacle, without the need for repositioning the surveying station, e.g. a geodetic device, which is usually much more complex and time consuming. In particular, for high obstacles and large height extensions, mainly for stability reasons, it could also be advantageous to attach the surveying pole to a tripod.

Particularly for short to midrange extensions of the surveying pole, the measurable height range of the pole may also be extended by attaching an extension tube, containing a target, to the lower pole section to replace the pointing tip, wherein the height of the position giving means can then be derived based on the detected light backscattered at the target contained in the extension tube. Therefore, the enclosed and thus stable and controlled measurement environment for the EDM unit is preserved, while the pole can still be pointed onto the measurement point on the ground and thus be held in a stable manner, particularly by hand.

The EDM unit can be embedded in one single housing, wherein the emission and the sensing of light by the EDM unit are pre-calibrated for stand-alone distance measurements. Thus, this allows for example for upgrading of conventional (and hollow) surveying poles without much technical outlay or for facilitated replacing of defect EDM units.

The EDM unit may be laid out for operation according to a phase measurement principle and/or by means of a pulse time-of-flight determination, wherein emitting and sensing of light is based on a bi-axial or a coaxial concept. In particular for improved short range distance measurements, the EDM unit may also operate according to a triangulation method, e.g. supported by triangulation means comprising imaging optics laid out in a Scheimpflug configuration and a line sensor. Furthermore, the EDM unit may comprise a standard operation mode and an additional operation mode optimized for short range measurements, in particular based on a triangulation method.

Electric power supply means, particularly a battery unit, can be attached to the pole or placed inside the pole, in particular wherein the electric power supply means is exchangeable and/or rechargeable.

In a further embodiment, the pole comprises wireless communication means, particularly a Bluetooth device, for transmitting and receiving information between the pole and a receiving device, the receiving device particularly being a handheld controller of a geodetic instrument.

The position giving means that can be attached to the pole may comprise a reflector cooperating with a geodetic instrument, and/or a GNSS antenna. Moreover, the pole may further comprise a tilt sensor unit with a defined spatial position relative to the pointing tip, the tilt sensor unit particularly including an inertial measuring unit, accelerometers, digital inclinometers, an electronic bubble level, or any combination thereof. Thus, the additional information being derived may comprise at least one of the following: tilting information acquired by the tilt sensor unit, and position information acquired by the GNSS antenna and/or by a geodetic instrument with means of the reflector.

The pole may also comprise a controller unit for controlling, feeding and reading the wireless communication means, storing the height information, particularly in combination with tilting information and/or position information, and making said information retrievable, the controller unit (8) particularly comprising a display unit (9) for providing output of said information.

In another embodiment of the invention, the pole comprises a motorization for the pole sections, whose control is supported by the EDM unit and/or the controller unit, the controller unit particularly having a user interface for entering a desired height of the pole.

In particular for quick setup, the pole may further comprise means for automatically detecting a height adjustment of the pole by the user, e.g. by sensing an activation of the fixation means of the pole sections, and as a result initiating a new height measurement by the EDM unit, in particular wherein the new height information is automatically transmitted to a receiving device, the receiving device particularly being a handheld controller of a geodetic instrument.

For preventing false geodetic measurements caused by unintentional height changes of the pole, e.g. due to shocks to the pole during a geodetic measurement, there may also be a monitoring operation mode for automatically detecting a height change of the pole, in particular by periodic automatic height measurements by the EDM unit, and in case of a detected change that is larger than a given threshold, issuing a warning signal to the user, and/or initiating a new height measurement by the EDM unit, in particular wherein the new height information is automatically transmitted to a receiving device, the receiving device particularly being a handheld controller of a geodetic instrument.

BRIEF DESCRIPTION OF THE FIGURES

In the following, the invention will be described in detail by referring to example embodiments that are accompanied by figures, in which:

FIG. 1: an example measuring task for the inventive surveying pole;

FIG. 2a,b: embodiments of the inventive surveying pole comprising a controller unit and a position giving means;

DETAILED DESCRIPTION

Figure 3:
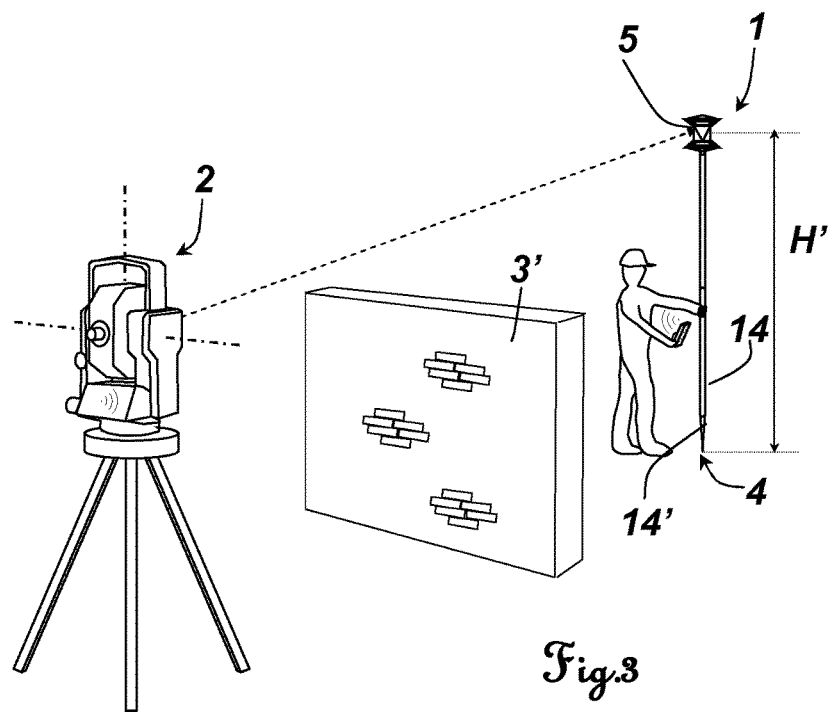
FIG. 3: an example measuring task for the inventive surveying pole, using an extension tube to extent the height measuring range of the pole to overcome a high obstacle.

FIG. 1 shows a typical surveying scene where a measurement is taken with a geodetic instrument 2 and a surveying pole 1. In this scenario, an obstacle 3 is blocking the direct visual contact between the measuring device 2 and the target point 4 on the ground. A height H can be measured by the surveying pole, in the very moment a measurement of the reflector 5 of the surveying pole 1 was taken. By means of wireless communication (not shown in FIG. 1) instrument 2 and pole 1 are designed to exchange information about measurement time, measurement values, measurement results, etc.

FIGS. 2a and 2b show in more details the build-up of the surveying pole 1, whereby the position giving means can be a reflector 5 (FIG. 2a) or a GNSS antenna 6 (FIG. 2b), by way of example. The surveying pole 1 comprises wireless communication means 7 which is connected with a controller unit 8. Alternatively, also a tablet or a smartphone can be attached to the pole for undertaking the function of a controller and also the function of a wireless communication means. Optionally, the pole 1 can further comprise a displaying unit 9 for directly outputting the height information and functionalities like immediate height difference calculations or the like, what the displaying unit 9 also can provide buttons for. The pointing tip 13 at the lower end of the pole is a positioning and pointing help. In further embodiments of the invention (e.g. FIGS. 3 and 4) the tip is detachable and/or replaceable by extension tubes 14,15 with (FIG. 3) or without their own pointing tips 14',15' (FIG. 4,7).

The rod system of the pole 1 comprises at least two pole sections 11,11'—further pole sections 11$^x$ (not shown) accordingly inserted can optionally be provided. A fixation means 10 can fixate the telescopic pole sections so that their positioning relative to each other is fixed. Also, the slide mechanism can be designed such that a friction force is sufficient to hold the height of the pole and a fixation means is not necessary.

The grip 12 serves as a carrier for fixation means 10, displaying unit 9, controller 8 and/or wireless communication means 7.

Figure 4:
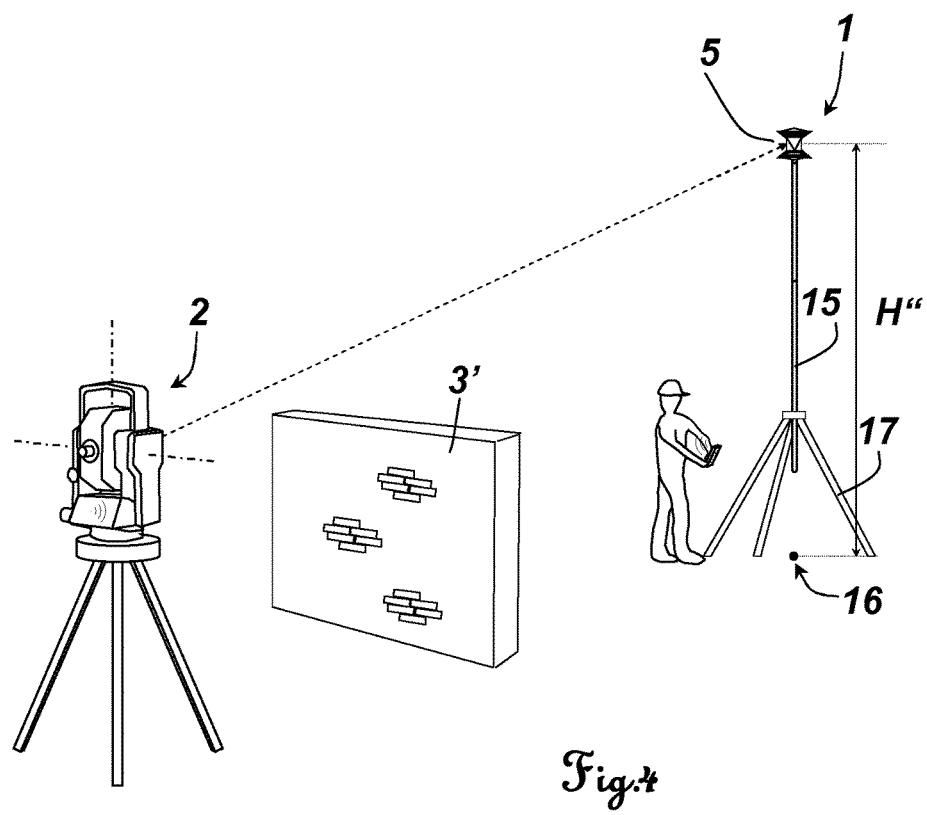
FIG. 4: an example measuring task for the inventive surveying pole to overcome a high obstacle, using a tripod for stabilization of the pole and directly measuring the distance between the EDM unit and the ground.

FIG. 3 shows another typical surveying scene similar to the scene in FIG. 1. However, this time the obstacle 3' is too high, even for fully extended pole sections, and would block the sight between the measuring device 2 and the reflector 5 of the surveying pole 1. Thus the range for the measurable height H' of the surveying pole is extended by using an extension tube 14, having its own pointing tip 14'. In particular this embodiment preserves the enclosed and thus stable and controlled measurement environment for the EDM unit, while the pole 1 can still be pointed onto the measurement point 4 on the ground and thus be held in a stable manner, particularly by hand.

FIG. 4 shows a typical surveying scene similar to the scenes in FIGS. 1 and 3, where an even larger measuring height H" needs to be accomplished by the surveying pole 1. The pole is extended by replacing its detachable pointing tip 13 by an extension tube 15, with an open lower end, and the height H" is determined by measuring the distance between the EDM unit (not visible) and the ground. To facilitate the pointing of the pole onto the target point on the ground, the light emitted by the EDM unit is in the visible range, and thus produces a visible marking point 16 on the ground. Of course, the in such a way extended surveying pole can still be held by hand but in some cases it might also be useful to fix and/or stabilize the pole by a tripod 17 as indicated in the figure.

Figure 5A:
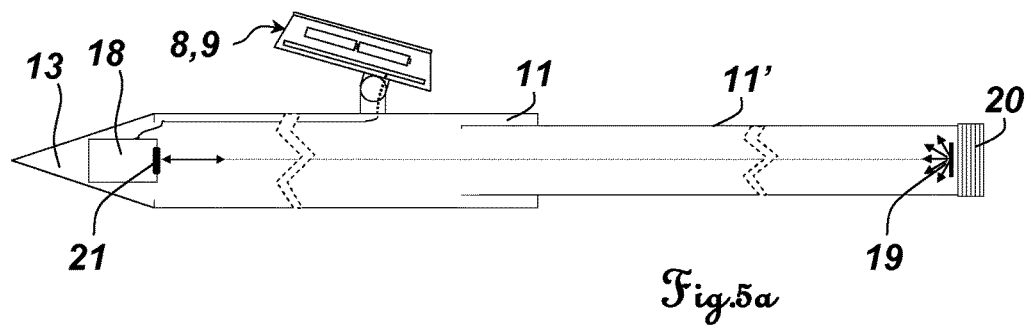
FIG. 5a,b: embodiments of the height measuring system according to the invention, the EDM unit being placed in a lower section of the pole, and the light being emitted upwards.
Figure 5B:
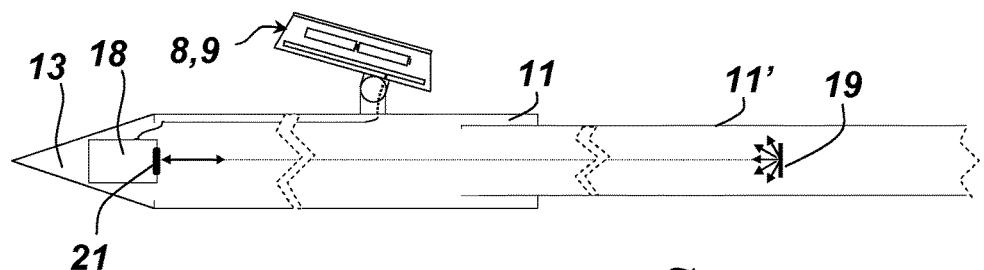

FIG. 5a and FIG. 5b show specific embodiments of the height measuring system according to the invention, where the EDM unit 18 is placed in a lower section 11 of the pole and the light is emitted upwards. In both arrangements the power supply for the EDM unit is placed outside of the pole within a controlling and displaying unit 8,9, and the EDM setup of the detecting and sensing area 21 is laid out for coaxial operation. Placing the EDM unit in a lower pole section 11 can be advantageous for aiming towards a more favorable weight distribution to the lower end of the pole or for facilitating or sharing the power supply and/or electronic connections between the EDM unit and other devices attached to the lower pole section, for example a displaying unit 9.

FIG. 5a shows an arrangement where the EDM unit 18 is placed inside the pointing tip 13, at the lower end of the lower pole section 11, and the target 19 is placed at the upper end of the upper pole section 11', as close as possible to the receptacle 20, where a position giving means 5,6 can be attached (not shown) to the pole. Since the operation range or accuracy of most common EDM units starts to be limited as soon as the measurement distance falls below a certain range, e.g. most common EDM units operating according to a phase measurement principle and/or by means of a pulse time-of-flight determination, the shown embodiment with maximal separation between EDM unit 18 and target 19 enables height measurements over the full range of possible height adjustments of the surveying pole, e.g. from fully retracted pole sections 11,11' to fully extended pole sections 11,11'.

FIG. 5b shows an arrangement where the EDM unit 18 is still placed inside the pointing tip 13, at the lower end of the lower pole section 11. However, the target 19 is not placed at the upper end of the upper pole section 11' anymore, but rather generally at a certain place within the upper pole section 11'. Thus, this embodiment allows for placement of further equipment above the target position, e.g. additional power supplies for the attached position giving means 5,6, that can thus be placed inside the upper pole section for better weight distribution and therefore lead to improved handling of the pole, in particular when holding the pole by hand, particularly when using already heavy and bulky positional giving means 5,6.

Figure 6A:
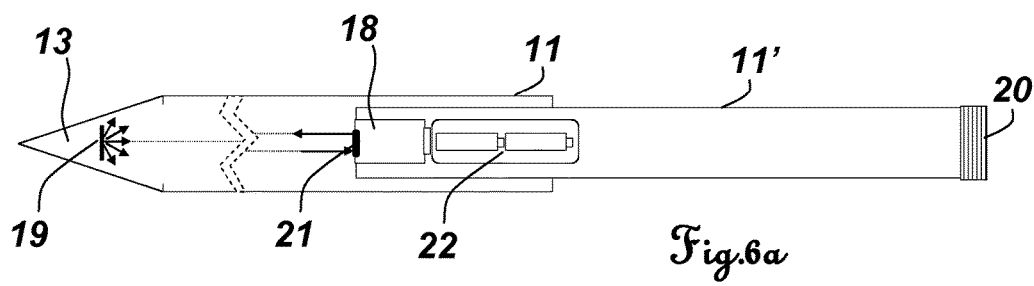
FIG. 6a,b: other embodiments of the height measuring system according to the invention, the EDM unit being placed in an upper section of the pole, and the light being emitted downwards.
Figure 6B:
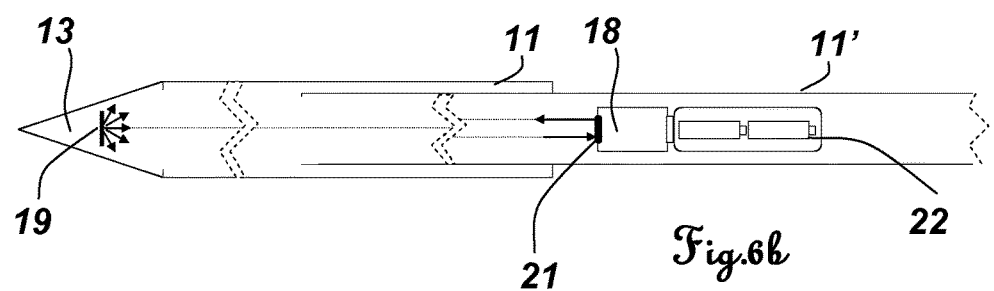

FIG. 6a and FIG. 6b show specific embodiments of the height measuring system according to the invention, where the EDM unit 18 is placed in an upper section 11' of the pole and the light is emitted downwards. In both arrangements the power supply 22 for the EDM unit 18 is placed inside of the pole, and the EDM setup of the detecting and sensing area 21 is laid out for bi-axial operation. Emitting the light beam downwards facilitates a quick extension of the measurable height range of the surveying pole, e.g. no extension of electric connections is required. For example, a facilitated way for extending the surveying pole can be very favorable in terrain with many high obstacles that could potentially block the sight between the surveying station 2 and the position giving means 5,6, in particular because repositioning and recalibrating the surveying station 2, e.g. a geodetic device, is usually complex and time consuming. Therefore, in both arrangements shown in FIGS. 6a and 6b, the target 19 is placed inside the pointing tip 13, which can be detached (see FIG. 7) for extending the measurable height range of the surveying pole, by using extension tubes, comprising their own targets or by directly measuring the distance between the EDM unit and the ground.

FIG. 6a shows an arrangement where the EDM unit 18 is placed at the lower end of the upper pole section 11', making sure that still a suitable weight distribution close to the ground is achieved. To overcome possible EDM unit restrictions for short distance measurements, for close to fully retracted pole sections 11,11', the EDM unit 18 may comprise a standard operation mode and an additional operation mode optimized for short range measurements, in particular based on a triangulation method. Of course, as it is shown in FIG. 6b, the possible problem of short range measurements could for example also be overcome by placing the EDM unit 18 further up in the upper pole section 11', and so finding a compromise solution between a short range limitation of an EDM unit and an optimized weight distribution of the surveying pole 1.

Figure 7:
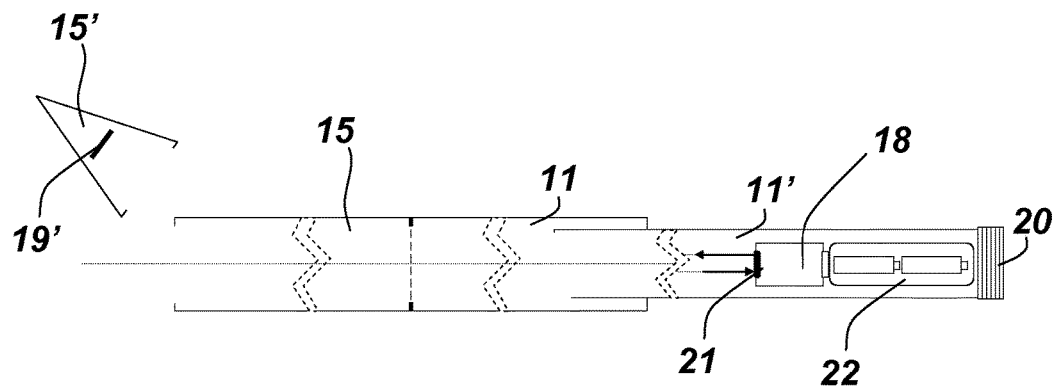
FIG. 7: another embodiment of the height measuring system according to the invention, the EDM unit being placed in an upper section of the pole and the pointing tip being detachable.

An extended surveying pole 1 is shown in FIG. 7, showing a pole arrangement with the EDM unit 18 placed at the upper end of the upper pole section 11', as close as possible to the receptacle 20, e.g. providing the advantage of sharing the power supply and/or electronic connections with a position giving means 5,6 attached to the receptacle 20. The pointing tip 13 has been detached, together with the target 19 therein, and the lower pole section 11 is extended by an extension tube 15. The distance of the position giving means to the terrain point can now be derived by either measuring the distance between the EDM unit 18 and the ground, or by attaching a pointing tip 15' with a target 19' therein and thus by measuring the distance between the EDM unit 18 and the target 19'.

Figure 8:
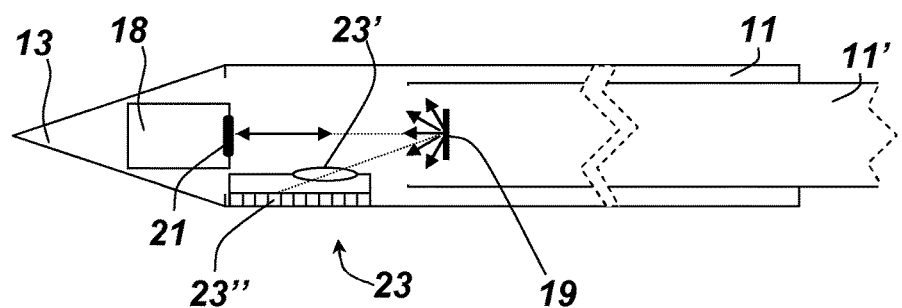
FIG. 8: another embodiment of the height measuring system according to the invention, the EDM unit being supported by triangulation means according to the Scheimpflug principle.

FIG. 8 shows an embodiment where the EDM unit 18 is supported by a triangulation means 23, comprising imaging optics laid out according to the Scheimpflug principle 23' and a line sensor 23". This setup is particularly useful for embodiments where the distance between the EDM unit 18 and the target 19 might become too short for a phase measurement or a pulse time-of-flight determination.

Although the invention is illustrated above, partly with reference to some preferred embodiments, it must be understood that numerous modifications and combinations of different features of the embodiments can be made. All of these modifications lie within the scope of the appended claims.

What is claimed is:

1. A surveying pole comprising:
   at least two pole sections being telescopically insertable into each other so that a height adjustment of the pole is provided,
   a pointing tip at a lower end of the pole for setting the pole on a terrain point,
   a receptacle at an upper end of the pole for mounting a position giving means,
   a height measuring system for indicating the distance of the position giving means relative to the terrain point, wherein:
   the height measuring system comprises an electronic distance measuring unit, in the following called EDM unit, and a target, the EDM unit and the target being placed inside of the pole in such a way that the EDM unit being adapted to emit a light beam towards the target and to detect the light backscattered by the target, the light beam following a path inside of the pole,
   the EDM unit and the target further being mounted to the at least two pole sections so that a correlation between the height adjustment of the pole and the separation of the EDM unit and the target is provided, and
   an evaluation unit for deriving the height of the position giving means based on the detected light of the EDM unit.

2. The surveying pole according to claim 1, wherein:
   the EDM unit being placed at an upper or lower end of the upper pole section and emitting the light in the visible range downwards, and
   the target being placed at a lower or upper end of the lower pole section or inside the pointing tip, wherein the pointing tip with the target mounted therein being detachable,
   the height of the position giving means being derived based on the detected light backscattered by the target, or, in case of the pointing tip being detached, backscattered at the ground.

3. The surveying pole according to claim 2, wherein:
   the pointing tip with the target mounted therein being detached and replaced by an extension tube comprising a pointing tip and a target mounted therein, the height of the position giving means being derived based on the detected light backscattered by the target contained in the pointing tip of the extension tube.

4. The surveying pole according to claim 1, wherein:
   the EDM unit being placed at a lower or upper end of the lower pole section or inside the pointing tip, emitting the light upwards, and
   the target being placed at the upper or lower end of the upper pole section.

5. The surveying pole according to claim 1, wherein:
   the EDM unit being embedded in one single housing, and the emission and the sensing of light by the EDM unit being pre-calibrated for stand-alone distance measurements.

6. The surveying pole according to claim 1, wherein:
   the EDM unit operating according to a phase measurement principle and/or by means of a pulse time-of-flight determination, wherein emitting and sensing of light being based on a bi-axial or a coaxial concept.

7. The surveying pole according to claim 1, wherein:
   the EDM unit operating according to a triangulation method.

8. The surveying pole according to claim 1, wherein:
   the EDM unit comprising a standard operation mode and an additional operation mode optimized for short range measurements based on a triangulation method.

9. The surveying pole according to claim 1 further comprising:
   an electric power supply means being attached to the pole or placed inside the pole, wherein the electric power supply means is exchangeable and/or rechargeable.

10. The surveying pole according to claim 1, further comprising:
    wireless communication means for transmitting and receiving information between the pole and a receiving device, the receiving device being a handheld controller of a geodetic instrument.

11. The surveying pole according to claim 1, wherein the position giving means comprises a reflector cooperating with a geodetic instrument.

12. The surveying pole according to claim 1, wherein the position giving means comprises a GNSS antenna.

13. The surveying pole according to claim 1, further comprising a controller unit for:
    controlling, feeding, and reading the wireless communication means,
    storing the height information gathered by a tilt detection unit, and/or position information, and
    making said information retrievable.

14. The surveying pole according to claim 13, wherein the controller unit comprises a display unit for providing output of said information.

15. The surveying pole according to claim 1, further comprising a motorization for the pole sections, whose control is supported by the EDM unit.

16. The surveying pole according to claim 1, further comprising a motorization for the pole sections, whose control is supported by the controller unit, the controller unit having a user interface for entering a desired height of the pole.

17. The surveying pole according to claim 1, further comprising means for automatically detecting a height adjustment of the pole and as a result initiating a new height measurement by the EDM unit, wherein the new height information being automatically transmitted to a receiving device, the receiving device being a handheld controller of a geodetic instrument.

18. The surveying pole according to claim 1, further comprising:
   a monitoring operation mode for automatically detecting a height change of the pole and, in case of detecting a height change larger than a given threshold, issuing a warning signal to the user, and/or initiating a new height measurement by the EDM unit, wherein the new height information being automatically transmitted to a receiving device, the receiving device being a handheld controller of a geodetic instrument.

19. The surveying pole according to claim 18, wherein automatically detecting a height change of the pole is performed by periodic automatic height measurements by the EDM unit.

* * * * *